(12) United States Patent
Keller et al.

(10) Patent No.: US 11,634,011 B2
(45) Date of Patent: Apr. 25, 2023

(54) ROAD VEHICLE HAVING AN AMBIENT AIR PURIFICATION DEVICE, AMBIENT AIR PURIFICATION DEVICE AND FILTER ELEMENT

(71) Applicant: MANN+HUMMEL GmbH, Ludwigsburg (DE)

(72) Inventors: Florian Keller, Ludwigsburg (DE); Andreas Pelz, Kornwestheim (DE); Gunnar-Marcel Klein, Oberstenfeld (DE); Thomas Loehl, Mundelsheim (DE); Thilo Mueller, Karlsruhe (DE); Christoph Schulz, Stuttgart (DE); Jens Gusek, Freudental (DE)

(73) Assignee: MANN+HUMMEL GmbH

( * ) Notice: Subject to any disclaimer, the term of this patent is extended or adjusted under 35 U.S.C. 154(b) by 794 days.

(21) Appl. No.: 16/514,307

(22) Filed: Jul. 17, 2019

(65) Prior Publication Data

US 2020/0031204 A1     Jan. 30, 2020

Related U.S. Application Data

(63) Continuation of application No. PCT/EP2018/051224, filed on Jan. 18, 2018.

(30) Foreign Application Priority Data

Jan. 18, 2017  (DE) .......................... 102017000412.9
May 22, 2017  (DE) .......................... 102017004864.9
Jul. 19, 2017  (DE) .......................... 102017006794.5

(51) Int. Cl.
*B60H 3/06*  (2006.01)
*B62D 27/02*  (2006.01)
(Continued)

(52) U.S. Cl.
CPC ......... *B60H 3/0658* (2013.01); *B01D 46/001* (2013.01); *B01D 46/003* (2013.01);
(Continued)

(58) Field of Classification Search
CPC ................ B60H 3/065; B60H 1/00271; B60H 3/0641; B60H 1/00521; B60H 2003/0683;
(Continued)

(56) References Cited

U.S. PATENT DOCUMENTS 9,308,484 B1    4/2016  Harper
2006/0107636 A1  5/2006  Gage
(Continued)

FOREIGN PATENT DOCUMENTS

DE        10329961 A1    1/2005
DE     202005005673 U1   9/2005
(Continued)

*Primary Examiner* — D Glenn Dayoan
*Assistant Examiner* — Dana D Ivey

(57) ABSTRACT

A road vehicle with a vehicle frame and a rear axle connected to the vehicle frame is provided with an ambient air purification device with filter elements for removing dust, particulate matter, and gases from ambient air. The ambient air purification device is arranged transverse to a longitudinal vehicle axis in an exterior region of the road vehicle at a vehicle rear of the road vehicle in an underfloor region such that at least the filter elements are arranged behind the rear axle of the road vehicle in a travel direction of the road vehicle. The ambient air purification device is received in an installation space of the vehicle frame. The ambient air purification device is flowed through in longitudinal vehicle direction. A free outflow zone of the ambient air purification device is arranged, in travel direction of the road vehicle, behind the ambient air purification device.

28 Claims, 9 Drawing Sheets

(51) Int. Cl.
  *B62D 21/15*  (2006.01)
  *B60H 1/00*   (2006.01)
  *B01D 46/00*  (2022.01)
  *B01D 46/02*  (2006.01)
  *B01D 46/52*  (2006.01)
  *B01D 46/62*  (2022.01)
  *F24F 13/02*      (2006.01)
  *F24F 8/99*       (2021.01)

(52) U.S. Cl.
  CPC ..... *B01D 46/0006* (2013.01); *B01D 46/0043* (2013.01); *B01D 46/023* (2013.01); *B01D 46/522* (2013.01); *B01D 46/523* (2013.01); *B01D 46/645* (2022.01); *B60H 1/00271* (2013.01); *B60H 3/0641* (2013.01); *B62D 21/155* (2013.01); *B62D 27/02* (2013.01); *B01D 2273/30* (2013.01); *B01D 2279/40* (2013.01); *B60H 1/00521* (2013.01); *B60H 3/0608* (2013.01); *B60H 2003/0683* (2013.01); *F24F 8/99* (2021.01); *F24F 13/0272* (2013.01); *F24F 2221/12* (2013.01); *Y02A 50/2351* (2018.01)

(58) Field of Classification Search
  CPC ............... B60H 3/0608; B60H 3/0658; B01D 46/0006; B01D 46/001; B01D 46/003; B01D 46/0043; B01D 46/023; B01D 46/522; B01D 46/523; B01D 46/645; B01D 2273/30; B01D 2279/40; B62D 21/155; B62D 27/02; F24F 8/99; F24F 13/0272; F24F 2221/12; Y02A 50/2351
  USPC ........................................................ 454/146
  See application file for complete search history.

(56) References Cited

U.S. PATENT DOCUMENTS

| | | | |
|---|---|---|---|
| 2010/0095924 | A1 | 4/2010 | Harper |
| 2015/0013542 | A1* | 1/2015 | Hasenfratz ............. B01D 46/62 55/497 |
| 2015/0285112 | A1* | 10/2015 | Mathiasson ............... F01N 3/32 95/1 |
| 2016/0067647 | A1 | 3/2016 | Tate et al. |

FOREIGN PATENT DOCUMENTS

| | | | |
|---|---|---|---|
| DE | 202006019335 U1 | | 4/2008 |
| DE | 102017008745 A1 | | 3/2018 |
| EP | 1606128 A1 | | 9/2004 |
| EP | 1837066 A2 | | 9/2007 |
| EP | 2263776 A1 | | 12/2010 |
| JP | H04297341 A | | 10/1992 |
| JP | 2008302803 A | | 12/2008 |
| JP | 2008302803 A | * | 12/2008 |
| KR | 20140147553 A | | 12/2014 |
| KR | 20150116014 A | | 10/2015 |
| WO | 2005068053 A1 | | 7/2005 |
| WO | 2005094969 A1 | | 10/2005 |
| WO | 2009105800 A1 | | 9/2009 |
| WO | 2009155809 A1 | | 12/2009 |
| WO | 2010084385 A1 | | 7/2010 |
| WO | 2013023240 A1 | | 2/2013 |

\* cited by examiner

US 11,634,011 B2

ROAD VEHICLE HAVING AN AMBIENT AIR PURIFICATION DEVICE, AMBIENT AIR PURIFICATION DEVICE AND FILTER ELEMENT

CROSS-REFERENCE TO RELATED APPLICATIONS

This application is a continuation application of international application No. PCT/EP2018/051224 having an international filing date of 18 Jan. 2018 and designating the United States, the international application claiming a priority date of 18 Jan. 2017 based on prior filed German patent application No. 10 2017 000 412.9, a priority date of 22 May 2017 based on prior filed German patent application No. 10 2017 004 864.9, and a priority date of 19 Jul. 2017 based on prior filed German patent application No. 10 2017 006 794.5, the entire contents of the aforesaid international application and the aforesaid German patent applications being incorporated herein by reference.

BACKGROUND OF THE INVENTION

The invention relates to a road vehicle, in particular but not limited thereto, a passenger car or a truck, in particular a light truck, that comprises an ambient air purification device that is embodied in particular for separating dusts, in particular particulate matter, and/or gases. Moreover, the invention relates to an ambient air purification device as such and to a filter element therefore.

Due to the progressing urbanization, there is the problem that, primarily in metropolitan areas, limit values for particulate matter and/or gases, such as ozone, $NO_x$, CO, in the ambient air may be exceeded by several orders of magnitudes by industrial pollution, the road traffic, and private fireplaces, primarily in adverse weather conditions (no rain, inversion, minimal wind speed, no air exchange between air layers).

One approach already documented in the prior art is to utilize the already existing vehicles (for example, approximately 44 million in Germany in the year 2014, more than 106 million in China) as mobile ambient air purifiers.

In DE 20 2006 019 335 U1, a particulate matter suction device for a vehicle is described which is arranged at the undercarriage of the vehicle and is used for filtration of the air flow that is to be introduced into the interior of the vehicle. The particulate matter suction device comprises a blower in a housing that draws in an air flow from the ambient into the housing and supplies it to a filter element. For assisting in the supply of the air mass flow into the particulate matter suction device, a projecting flow deflector is arranged at the housing.

Moreover, JP H04297341 A1 discloses a suction device which is mounted at a truck. Here, between the driver=s cabin and the box body, an intake hood is provided through which the air to be purified is supplied to a purification device that is arranged along the longitudinal vehicle axis in a region below the box body. The purification device comprises a blower in order to achieve flow under as many operating conditions as possible, even when parked.

Moreover, passive flow-through systems are disclosed in WO 2005/094969 A1 (arrangement at the sidewall of a vehicle) and US 2006/0107636 A1 (arrangement on the roof).

DE 20 2005 005 673 U1 discloses a passive ambient air purification device that is arranged below a rear bumper face bar and whose filter element is flowed through vertically so that, at least at the inflow side, a hood must be provided which produces an unnecessary pressure loss.

WO 2009/105800 A1 discloses an ambient air purification device which is arranged either on the roof of a truck or in the region of the vehicle front wherein vehicle parts are positioned within the flow path downstream of the filter, respectively.

WO 2004/080740 A1 discloses a motor vehicle with an external air filter which is arranged in a region affected by the rear wheels of the vehicle, for example, in a wheel well liner or as a part of a rear mud flap. Disadvantageously, noteworthy filter surfaces for filtering a meaningful quantity of air can hardly be provided at the installation spaces described therein.

The solutions known from the prior art are employed in installation spaces that make it hardly possible to accommodate large filter surfaces so that, as a result of the significant flow resistances, hardly relevant air quantities can be conveyed through the employed filter elements, and/or the dimensions of the vehicle as well as thereby its aerodynamics, in particular the cW value and/or a projected inflow surface, are changed disadvantageously and/or have a negative effect on the visual appearance of the vehicle so that they have been hardly marketable up to now.

SUMMARY OF THE INVENTION

The invention has therefore the object to provide a road vehicle with an ambient air purification device, in particular for removing particulate matter from the ambient air, which is distinguished in that a greater air flow can be passed through and/or an improved separating effect can be obtained and in that it exhibits a particularly good installation space utilization. Preferably, no auxiliary energy for operation shall be required and the appearance and/or the aerodynamic parameters of the vehicle shall not be disadvantageously affected, or affected as little as possible.

This object is solved by the road vehicle according to the invention, in particular a passenger car or a truck, in particular a light truck, comprising an ambient air purification device that is in particular embodied for removing dusts, in particular particulate matter, and/or gases from the ambient air. The ambient air purification device comprises at least one filter element and is arranged transverse to a longitudinal vehicle axis in an external region of the road vehicle. The ambient air purification device is arranged in an underfloor region at a vehicle rear such that at least the at least one filter element is present behind the rear axle of the road vehicle, wherein the ambient air purification device can be flowed through in longitudinal vehicle direction. Preferably, a free outflow zone is provided behind the ambient air purification device in travel direction. The ambient air purification device is received in accordance with the invention in an installation space that is provided by a vehicle frame.

This object is further solved by the ambient air purification device according to the invention for a road vehicle according to the invention. The ambient air purification device is embodied in particular for removing dusts, in particular particulate matter, and/or gases from the ambient air, wherein the ambient air purification device comprises at least one filter element and can be arranged transverse to a longitudinal vehicle axis in an external region of the road vehicle. The ambient air purification device is embodied to be arranged in an underfloor region at a vehicle rear such that at least the at least one filter element in a mounted state, viewed in travel direction, is present behind a rear axle of the road vehicle and the ambient air purification device is receivable in an installation space provided by a vehicle frame so that it can be flowed through in longitudinal vehicle direction and a free outflow zone is present in particular in travel direction behind the ambient air purification device.

The object is further solved by a filter element for the ambient air purification device according to the invention.

Herein, vehicle frame is to be understood in particular as a ladder type frame or box type frame as it is used in particular in trucks. As a core feature, this frame construction comprises at least two longitudinal beams extending in the longitudinal vehicle direction which may be connected by cross members for reinforcement.

As an alternative to the flow direction Ain longitudinal vehicle direction@, the flow can also be referred to as Ahorizontal@ when the vehicle is standing on a horizontal support. In a beneficial arrangement of inlet and outlet openings for the air to be purified and a corresponding conduit of the air to be purified within the ambient air purification device, a flow control within the ambient air purification device at least partially perpendicular to the travel direction is also possible, of course. Preferred is an arrangement behind the rear axle, in particular behind the rear wheels, or on the vehicle roof or in the rear region in the region of a rear bumper face bar or integrated in a rear bumper face bar.

The arrangement in the underfloor region at the rear of the vehicle has the decisive advantage relative to all currently known arrangement variants that in this way the outer dimensions/outer design of the vehicle is not changed and that the flow resistance of the vehicle thereby is hardly noticeably increased while the superstructures and/or attachments as known from the prior art cause a deterioration of the flow about the vehicle. Moreover, in particular in trucks with a (ladder type) frame construction, it was surprisingly found that a sufficient flow is existing in an underfloor region at the vehicle rear behind the rear axle in order to operate such an ambient air purification device even purely passively, i.e., without devices such as fans or the like that produce a pressure differential, i.e., exclusively by the oncoming wind when driving.

Moreover, an arrangement of the ambient air purification device at the underfloor, i.e., close to the road surface, has the advantage that the ambient air sucked in from the ground area in general is significantly more strongly loaded with harmful substances, in particular particulate matter, compared to layers of air above. This correlation is characterized by the so-called wake factor; this is a conversion factor which is obtained by a comparison of air quality measurements at stationary measuring stations with vehicle-near measurements at the ground. Based thereon, loading at the vehicle-near ground is higher by approximately a factor 2 than the measured values at the stationary measuring stations.

It is therefore preferred to arrange the ambient air purification device or its air inlet at a height as low as possible. In this way, the absolute particle quantity separated per traveled distance can be increased.

Due to the arrangement of the ambient air purification device in an installation space that is provided by a vehicle frame, an otherwise unused installation space provided at this location in vehicles with vehicle frames is for the first time used in an expedient way. The term Ais received@ is not equivalent to Aconnected@; for example, the invention encompasses embodiments in which the ambient air purification device is connected with the vehicle frame itself (screwed on, riveted, welded or the like) as well as such embodiments in which it is arranged in the region of the installation space provided by the vehicle frame but is attached to a different device component.

The road vehicle may be a truck with a vehicle frame that comprises a superstructure, in particular a box body. The ambient air purification device can be attached to the superstructure and/or the vehicle frame. In particular the road vehicle can be a light delivery truck as it is used for delivery services.

According to a particular embodiment, it is provided that the accommodation of the ambient air purification device is realized between at least two longitudinal sections and/or transverse sections of the vehicle frame, wherein one of the transverse sections may be, for example, also an underride protection at a rearward vehicle end. In particular, the ambient air purification device can be substantially flush in vertical vehicle direction with a top side of the aforementioned frame sections so that in vertical vehicle direction an optimal installation space utilization is achieved.

The ambient air purification device can be dimensioned in vertical direction with regard to its dimensions such that it does not project past the respective frame sections. The invention is however not limited thereto; embodiments are also possible according to which the ambient air purification device has a greater height than the respective frame section.

A 'free outflow zone' means that in flow direction downstream of the filter element of the ambient air purification device no installations are present that disturb the flow because a purely passive flow (turbulences) would no longer be possible otherwise due to the increased pressure loss.

The filter element can be embodied as one piece or as multiple parts and comprise in particular a plurality of filter units, in particular filter bellows and/or filter pockets. Also, a plurality of sub filter elements can be provided which are joined to a filter element.

As a side effect, the ambient air purification device in an arrangement behind the rear axle of a vehicle acts also to reduce rocks being thrown and contributes thus to the safety of following vehicles. Due to the very simple construction of the ambient air purification device, existing vehicle fleets can also be retrofitted therewith without problems.

In order to provide an impression of the excellent efficiency of such a vehicle according to the invention with ambient air purification device, flow simulations based on the following parameters were performed:
- particle concentration in the test air with 25 Φg/m; PM2.5, 50 Φg/m; PM10,
- height of the filter element 300 mm,
- width of the filter element 600 mm,
- degree of separation for PM2.5 and PM10 80%, cellulose-based filter medium, thickness of the filter medium 0.7 mm, air permeability 700 l/m$^2$s with 9 m$^2$ effective filter surface.

Based on these assumptions, the result is that such a filter element for passive flow separates more PM10 particles than generated by the diesel engine. In this context, a PM10 emission of 6 mg/km was assumed. Therefore, the emissions can be reduced to the value of an electric vehicle. By installation of active components, for example, fans, the separation performance at low speeds can be improved still.

In a particularly preferred embodiment, the at least one filter element of the ambient air purification device can be flowed through in longitudinal vehicle direction or a 'horizontally', i.e., it is installed such in relation to the ambient air purification device that no flow deflections are required which generate a disadvantageous pressure loss.

According to a preferred embodiment, it can be provided that the ambient air purification device comprises at least one air conveying device for assisting the flow, in particular at least a fan or blower, wherein preferably the air conveying device in relation to the at least one filter element is arranged to provide suction. The air conveying device can be, for example, an axial fan or an axial blower. The air conveying device can in particular comprise an electrical drive that is connected electrically to the vehicle electrical system of the road vehicle. Axial blowers or fans are used preferably due to their advantageous installation dimensions, viewed in axial direction. The invention comprises therefore expressly passive flow ambient air purification devices as well as active flow ambient air purification devices with at least one air conveying device.

In a further embodiment, the ambient air purification device can be arranged above a transverse axis that is defined by a rotation axis of a wheel pair of the rear axle. Moreover, it is possible and expedient when in the underfloor region of the road vehicle a receiving device is provided with which, directly or indirectly, the ambient air purification device is connected. The receiving device can be any fastening means that appear suitable to a person of skill in the art, for example, fastener straps, screw connections, quick connect means and the like. In particular the at least one filter element that comprises a frame can be directly connected to the receiving device.

It can be advantageously provided that, in travel direction behind the ambient air purification device, no vehicle-associated devices are arranged which impair outflow from the ambient air purification device. As an alternative thereto, vehicle parts arranged behind the ambient air purification device, viewed in travel direction, for example, a transverse stay, a bumper face bar, paneling and the like, may have at least one passage in order to enable unhindered outflow from the ambient air purification device.

Moreover, the ambient air purification device can extend across a significant portion of a vehicle width at the vehicle rear. Preferably, the ambient air purification device extends across at least 30% of the vehicle width, more preferred across at least 40%. The ambient air purification device may even extend in transverse vehicle direction completely across a region which is positioned between the wheels of the rear axle, wherein the arrangement behind the rear axle is still at liberty. With such an arrangement, the employed filter element is optimally utilized in that its arrangement is matched to the flow conditions at the underfloor; in the regions which are covered in regard to flow by the wheels, a significantly reduced flow velocity exists compared to the Amiddle region@.

Even in case of an arrangement outside of the region of the vehicle axles, it is preferred that the ambient air purification device extends across a significant portion of a vehicle width in transverse vehicle direction, preferably at least across a width that corresponds to the spacing between two wheels of a vehicle axle.

It is preferred to arrange the ambient air purification device or its air inlet at a height as low as possible because the pollutant concentrations, in particular the particle concentration, decreases regularly with increasing height. In this way, the absolute particle quantity separated per traveled distance can be increased. Moreover, it is preferred to arrange the ambient air purification device external to the car body of the vehicle. The shape of a vehicle is usually designed such that the flow can be guided about the vehicle in the best possible way. An arrangement of the ambient air purification device external to the car body can therefore contribute to optimizing the air quantity which can be passed through the ambient air purification device, in particular when the ambient air purification device or flow deflecting means are designed, as preferred, so that a portion of the air which is flowing about the vehicle can be deflected in a targeted fashion to the ambient air purification device.

According to a further embodiment, it is furthermore possible that the ambient air purification device comprises at least one receiving housing in which the at least one filter element is received and that comprises at least one inlet opening and one outlet opening and that is connected to the road vehicle. In the intended travel direction, the inlet opening(s) can be provided at the receiving housing at the front and/or laterally, at the top or bottom. In case of a lateral arrangement at an upper, lower or lateral wall, an arrangement of the inlet opening(s) at the forward region of these walls, viewed in the travel direction, is preferred in order to be able to guide the flow with minimal constructive expenditure inside the ambient air purification device. The lateral arrangement is in particular advantageous in mounting positions which are not directly exposed to the oncoming wind when driving, such as below or behind the vehicle. Moreover, it is possible and expedient that the ambient air purification device comprises at least two filter elements which are arranged adjacent to each other in transverse vehicle direction, in particular at a predetermined spacing between them. Of course, more than two filter elements may be employed; this can be in particular expedient when the at least one filter element is assembled of several filter units or sub filter elements.

The receiving housing can comprise a titanium dioxide-containing coating at its exterior side for photo-catalytic oxidation of $NO_2$ to $NO_3$.

Between the filter elements, a spacing can be also provided which, for example, may serve for passing through cables, hydraulic lines and/or for receiving frame components and the like. Moreover, it can be expedient to employ two separate filter elements because one large filter element that extends across a significant portion of the vehicle width is difficult to produce and moreover has a great weight, which makes the exchange more difficult. In an embodiment with two or more separate filter elements, it can moreover be provided that each filter element comprises its own housing that, in turn, is connected to the underfloor region.

According to yet another embodiment, the ambient air purification device can comprise at least one flow deflector that is preferably provided at a forward, outer lateral edge, extending in vertical vehicle direction of the ambient air purification device. In this way, the filter element can be embodied to be comparatively small and the impact pressure upstream of the filter element can be increased so that, even at minimal travel speeds, a flow passing through is enabled. In a preferred embodiment, such flow deflectors are arranged at the forward lateral edges (vertical) of the ambient air purification device as well as at the lower transverse edge (horizontal), wherein it is particularly advantageous when the lower flow deflector extends as close as possible down to the road surface. Alternatively or in addition, flow deflector(s) can be arranged at a flank of the vehicle, for example, in a longitudinal region that is between the rear axle and the front axle. In this way, a tunnel effect of the undercurrent of the vehicle can be achieved so that a proportion of the undercurrent of the vehicle as large as possible passes through the ambient air purification device. The flank-side flow deflectors can also be embodied as shroud parts / planking parts or as part of a lateral underride protection. The at least one flow deflector can alternatively or additionally also be arranged in travel direction to the rear, for example, at a rear upper lateral edge, extending in transverse vehicle direction, of the ambient air purification device. It is also possible to provide more than two flow deflectors. It is expressly possible in this context that also at the outflow side, i.e., at the clean side, at least one flow deflector is present. An arrangement of the flow deflector in the travel direction to the rear is advantageous in order to enable in front of vehicle parts, for example, a transverse stay, a bumper face bar, a shroud, which otherwise would impair an outflow, an unhindered outflow, i.e., to indeed enable the free outflow zone.

The flow deflector can be a flow deflector plate that is preferably positioned tilted at an angle relative to the vertical vehicle direction, longitudinal axis or transverse axis. The flow deflector plate can be embodied, for example, as a flow guide plate or shaped rubber part, rubber profile and/or rubber lip. A tilted or angularly arranged flow deflector can be particularly advantageously employed in order to arranged the flow guiding action through the ambient air purification device at vehicle-associated installations or vehicle parts (e.g., a frame section, a transverse stay, an underride protection, a bumper face bar, other shroud parts). With regard to the material selection of the flow deflector, the invention is of course not limited to the aforementioned materials but also comprises other suitable materials, in particular also other synthetic materials.

Optionally, also a switching function of a flow deflector can be provided whereby this may be an adjustable flow guide plate that can be adjusted between various positions in order to influence the air flow guiding action. The flow guide plate is adjustable between an inoperative position and an operative position wherein, in the operative position, the air flow is guided to the filter element in the particulate matter suction device. In the inoperative position, however, the air supply to the filter element can be stopped. Preferably, the at least one flow deflector can be designed such that in driving operation the local air pressure in the inlet region of the ambient air purification device is increased and/or is lowered in the outlet region. In this way, the separation performance per travel distance can be improved.

In a preferred embodiment, it can be provided that the receiving housing of the ambient air purification device comprises an inlet channel region which is arranged downstream of the inlet opening in flow direction and which connects the inlet opening in fluid communication with the at least one filter element, wherein preferably a longitudinal extension of the inlet channel region is designed such that the inlet opening is located between a wheel pair guided by the rear axle. In this way, it is advantageously achieved that the region of the inlet opening is not positioned immediately in the splash region of the wheels of the rear axle, which reduces significantly the requirements in regard to a water separation of the ambient air purification device. In connection with a stabilized filter element as described herein (inner/outer fold stabilization means) a separate water separator may even be eliminated, as needed.

According to an advantageous further embodiment, it can be provided that the ambient air purification device comprises at least one pre- or coarse separator which is arranged upstream, viewed in travel direction, of the at least one filter element, in particular a separator grid, separator net, baffle plates and/or a preseparator nonwoven. Moreover, it can be provided in this context that the pre- or coarse separator, in particular the separator grid, is connected with the at least one flow deflector.

The pre- or coarse separator, in particular the separator grid, is primarily provided to prevent that foreign matter, which due to its kinetic energy might damage the filter element, can enter the filter element. The separator grid can be designed for this purpose as a coarse mesh and can have a mesh size of 1 mm to 4 mm, preferably 6 mm to 8 mm, so that only a negligible small additional pressure loss is generated by it. Such grids are available extremely inexpensively, for example, as aluminum expanded metal. In a further embodiment, it can however also be provided that the pre- or coarse separator fulfills a filtration function and comprises alternatively or additionally a nonwoven layer. A preseparator nonwoven can be arranged in particular at the raw side on the filter element, for example, glued thereto, or can be present at a predefined spacing to the filter element, wherein an arrangement directly on the filter element has the advantage that the preseparator nonwoven is exchanged together with the filter element during service. Advantageously, the preseparator nonwoven has in addition water-separating and draining properties and is therefore capable of additionally protecting the Amain filter element@.

According to an advantageous further embodiment, it can be provided that the ambient air purification device comprises at least one water separator for separating rain water that, viewed in travel direction, is arranged upstream of the at least one filter element, preferably arranged upstream or downstream of a coarse separator. The water separator can preferably comprise a lamellar separator and/or a hydrophobic, in particular hydrophobically impregnated, separator layer and/or in particular closable flaps or lamellas. The water separator can be switched on or positioned in the flow path, in particular as a function of a rain sensor signal or windshield wiper signal. In case of closable flaps or lamellas, they can be adjusted depending on the rain sensor signal. A windshield wiper signal, when coupling the ambient air purification device with the road vehicle, can be extracted without problems from a data bus of the vehicle and describes an operating parameter of a windshield wiper (e.g., on/off, wiper speed).

A further aspect of the invention concerns an ambient air purification device for a road vehicle, in particular for a truck, in particular for a light truck, is in particular embodied for removing dusts, in particular particulate matter, and/or gases from the ambient air. In particular, the road vehicle is a road vehicle according to the invention. The ambient air purification device comprises at least one filter element and can be arranged transverse to a longitudinal vehicle axis in an exterior region of the road vehicle. The ambient air purification device according to the invention is configured to be arranged in an underfloor region at a vehicle rear such that at least the at least one filter element in a mounted state, viewed in travel direction, is positioned behind the rear axle of the road vehicle. It is receivable in an installation space provided by the vehicle frame so that it can be flowed through in the vehicle longitudinal direction, wherein, in a mounted state, a free outflow zone is present in particular in travel direction behind the ambient air purification device.

According to an advantageous further embodiment, it can be provided that at the ambient air purification device a mounting opening for the filter element is provided which is in particular arranged laterally, vertically or, in intended travel direction, at the rear. In this context, it is preferred that the ambient air purification device comprises holding means for the at least one filter element which prevent by form fit a movement of the filter element in travel direction in order to prevent a release of the filter element in case of braking and rear-ending situations. The holding means are preferably configured such that the opening cross section within the holding means is smaller than the cross section of the filter element transverse to the travel direction.

Also, it can be provided that the ambient air purification device comprises a drawer mechanism and/or releasable locking connections for mounting the filter element in the ambient air purification device. In this way, an easily serviceable ambient air purification device can be provided.

The term filter element, on the other hand, is to be understood such that it can be embodied as one piece or as multiple parts and in particular can comprise a plurality of filter units, in particular filter bellows and/or filter pockets. A plurality of sub filter elements can also be provided which are joined to a filter element.

The advantages of such an arrangement have already been described in connection with the road vehicle according to the invention.

The height of the at least one filter element can be, for example, in a range between 100 mm and 600 mm, preferably between 150 mm and 500 mm.

The parameters that have the greatest effect on the separation performance of the ambient air purification device are the height of the filter element and the flow resistance of the filter element which is determined significantly by the filter concept but not by the inflow speed. Therefore, a certain minimum height must be observed in order to achieve a satisfactory separation performance.

According to a further embodiment, it is proposed to embody the filter element with an inflow surface of at least 100 mm×250 mm, preferably at least 150 mm×500 mm. Alternatively or in addition, it can be provided that the volume of the at least one filter element amounts to at least 6.5 l, preferably at least 20 l. The net filter surface of the at least one filter element should be at least 3 $m^2$, preferably at least 7 $m^2$, most preferred at least 15 $m^2$. In case of use of a partially or fully synthetic filter medium instead of a cellulose-based one, smaller filter surfaces may also be sufficient.

The filter element, alternatively or additionally, may comprise a plurality of fold stabilization means which, in an embodiment with folded filter bellows, support the latter and are provided at a lateral spacing of not more than 150 mm relative to each other.

The support of the filter bellows by fold stabilization means provided in accordance with the invention meets two concerns: Firstly, the filter element due to the travel speed, even in the underfloor region, is subjected to a very high impact pressure and, secondly, the filter element is exposed to wet conditions, not only by precipitation but also due to the actions when cleaning the vehicle, for example, with a high pressure cleaner.

Surprisingly, the aforementioned problems can be elegantly solved by supporting the folds of the filter bellows by fold stabilization means at a maximum spacing of 150 mm so that the filter element survives an inflow at $V_{max}$, e.g. 180 km/h, preferably >200 km/h, without being damaged, as well as that it cannot be damaged by external cleaning actions by high pressure cleaners. Without effective fold stabilization means, a filter element with classic bellows configuration in case of such mechanical action is at risk of compacting of the folds, i.e., a closure of the intermediate fold spaces, which leads to a sudden loss of filter surface and thus immediately causes a corresponding rise of the flow resistance and thus a corresponding drop of volume flow.

The range of the lateral spacing of the fold stabilization means in accordance with the invention of not more than 150 mm can advantageously be limited downwardly such that the spacing preferably is greater than 15 mm, preferably greater than 30 mm, because otherwise an unfavorable ratio of filter bellows regions covered by the fold stabilization means and free flow-through regions would be present.

Advantageously, a filter element with such fold stabilization means enables that an ambient air purification device provided therewith can be operated optionally without separate splashing water protection (flaps, rolling shutters or the like) because the filter element itself has such a great stability that a water impact action does not lead to damage of the filter element. The ambient air purification device comprises therefore only a minimal complexity and can be provided surprisingly inexpensively.

Various fold stabilization means are possible that fulfill this function.

In a particular embodiment, it can be provided that the fold stabilization means each extend parallel to each other, preferably in transverse fold direction. Other angular orientations are of course also possible, for example, diagonal. It is also possible to provide two groups of fold stabilization means that each extend parallel to each other and cross each other. A parallel extension has the advantage that it can be realized without problems by continuous manufacturing processes during the filter element manufacture. An arrangement of the fold stabilization means in transverse fold direction is in particular advantageous because in this case the smallest possible support length between two neighboring folds can be realized which leads to a particularly effective fold support.

In a further embodiment, it can be provided that the fold stabilization means are present at least to the rear in travel direction, i.e., at a clean air side of the filter element, preferably additionally at the front in travel direction, i.e., at a raw air side of the filter element. With such an arrangement at least at the clean side, it is reliably prevented that the folds will compact under the aforementioned mechanical loads. An arrangement additionally at the raw side increases the load resilience further wherein however the greater contribution to the filter element stiffness is provided by the clean-side fold stabilization means.

Moreover it can be provided that the filter medium has a bending stiffness of at least 1 $Nm^2$, preferably at least 2 $Nm^2$. This refers to an intrinsic bending stiffness of the filter medium, i.e., in an unprocessed/unfolded state.

According to yet another embodiment, the fold stabilization means can comprise at least an inner fold stabilization means that engages at least partially the intermediate fold spaces, preferably fills out the intermediate fold spaces. The inner fold stabilization means can be, for example, a continuous adhesive bead and/or an engaging stabilization comb. A Acontinuous adhesive bead@ is to be understood in the present case as an adhesive bead which, already prior to folding, is applied onto the flat filter medium and thus extends completely from the fold base to the fold tip after folding, i.e., is indeed embodied continuous. As an alternative or in addition thereto, at least one outer fold stabilization means can be provided that is connected at least with respective neighboring fold tips. The outer fold stabilization means can comprises at least one adhesive bead connected at least with the fold tips, at least one thread connected at least with the fold tips and/or at least one stabilization band or rib and/or at least one support grid. The outer fold stabilization means can moreover be connected by material fusion with the fold tips which contributes to an optimal force introduction from the fold tips into the outer fold stabilization means. Such a material-fused connection, for example, can be provided by welding the outer fold stabilization means to the filter bellows, in particular the fold tips, in particular by hot plate welding. In contrast to the inner fold stabilization means, the adhesive bead of the outer fold stabilization means is not a continuous adhesive bead but one that is connected surficially with the fold tips.

The adhesive beads of the inner and/or outer fold stabilization means can have a width in a range of 0.5 mm to 12 mm, preferably 1 mm to 8 mm. In a particular embodiment, the folds of the filter bellows are ΛblockedΛ@ so that the fold spacing corresponds to approximately twice the width of the continuous adhesive beads (as inner fold stabilization means). A hot melt is conceivable as material for the adhesive beads, for example.

Alternatively or additionally, the filter medium of the filter element of the ambient air purification device may comprise one or several embossment lines that preferably extend in transverse fold direction. By means of such embossment lines, the stiffness of the folds of the filter bellows is additionally increased by an increase of the geometrical moment of inertia, which additionally contributes to preventing a collapse/compacting of the folds under the action of pressure.

In a particularly preferred embodiment, it can be provided that the filter element of the ambient air purification device comprises a collapse pressure strength of at least 15 mbar, preferably at least 25 mbar.

The at least one filter element can comprise a single-layer or multi-layer filter medium that has at least a particle filter layer, in particular a cellulose layer and/or a synthetic fiber layer, in particular a synthetic fiber nonwoven, and/or at least a gas filtration layer, in particular with an active carbon bulk material as an active material. The gas filtration layer can be provided with corresponding active materials which enable an adsorption/absorption of various health-hazardous gases from the ambient air, for example, ozone, sulfur dioxide, nitrogen oxides, and carbon monoxide. For this purpose, different active materials can also be used. The active carbon can also be impregnated in order to improve the separation of certain gases, for example, by use of copper or copper compounds in order to increase the absorption of $NO_x$. By use of such an active carbon bulk material, the absorption performance of the employed filter element(s) can be adjusted such that the ambient air purification device absorbs approximately as much $NO_x$ as is emitted by the road vehicle to which it is mounted. Preferably, catalytic active carbon can be used that, for example, is useable for conversion of nitrogen oxide to less harmful substances, for example, nitrogen and carbon dioxide.

The ambient air purification device should exhibit a pressure loss for an inflow of the filter element with air at standard conditions with 1.5 m/s of at most 200 Pa, preferably at 2.5 m/s of at most 250 Pa.

The ambient air purification device according to the invention functions in one embodiment according to the principle of passive flow by means of the impact pressure which is generated by the travel speed. Since the problem of excessive air pollution primarily exists in metropolitan areas in which the travel speed is usually below 40 km/h, the pressure loss of the ambient air purification device should be so minimal that the latter is still flowed through at the impact pressures occurring at usual inner-city speeds. For example, the impact pressure at a travel speed of 30 km/h is approximately 40 Pa and at 40 km/h approximately 75 Pa.

Moreover, the at least one filter element can be a folded filter element that is embodied to be installed such that its folds extend in the longitudinal vehicle direction because, in this way, the inflow into the fold pockets is optimal. The fold heights of the filter element amount advantageously to at least 100 mm, particularly advantageously more than 200 mm; in this way, a comparatively large filter surface can be accommodated in a compact installation space. Alternatively, the filter element can be a so-called compact element. A 'compact element' is to be understood as a filter element that comprises a filter medium body which is comprised of alternatingly wound corrugated and flat layers of filter medium, wherein they are glued to each other across the surface. The flow channels which are formed by the corrugated layers are alternatingly closed off at the end faces, for example, by an adhesive plug.

Moreover, it can be provided that the filter element is a pocket filter element that comprises at least three filter pockets, preferably four or more filter pockets. Alternatively or additionally, also a V-filter element can be used that comprises at least three V-shaped filter units. Such filter element types are available on the market in the field of intake filters for gas turbines and/or HVAC systems in many size ranges.

Alternatively or additionally, the filter element can be a filter element that at least corresponds to the particle filter class M6 according to DIN EN 779.

In a further embodiment, the filter element can have a variable fold height, preferably a variable fold height viewed across a vertical vehicle axis. By means of this, for example, an adaptation of the outer contour of the filter element to an installation space at the vehicle rear can be achieved, for example, an adaptation to a contour of at least one vehicle part in the underfloor region, in particular of a wheel suspension and/or of at least one wheel and/or of at least one auxiliary device and/or of an exhaust system and/or of a vehicle battery. However, viewed in longitudinal vehicle direction, the fold height can in particular decrease toward the vehicle rear so that the filter element, respectively, the ambient air purification device does not come into contact with the road surface when driving on ascending slopes.

The features which have been disclosed in connection with the ambient air purification device according to the invention can be combined in any combination also with the road vehicle according to the invention, and vice versa.

Finally, a filter element for the ambient air purification device according to the invention is claimed. The features and advantages which have been mentioned in relation to the road vehicle according to the invention and to the ambient air purification device according to the invention are transferable thereon in any combination.

Furthermore, a method for reducing the total emission of a road vehicle with at least one predetermined emission component is described in the following. The method provides that in particular an ambient air purification device according to the invention is mounted in a predetermined mounting position at a road vehicle, wherein the ambient air purification device is configured for mounting in the mounting position such that in driving operation through the ambient air, in which predefined limit values are reached or surpassed and which is supplied in the region of the mounting position to the ambient air purification device, at least the quantity of the average emission of the at least one emission component is separated by means of the ambient air purification device. A vehicle which is obtainable by this method is also part of the present invention.

For example, in this context a determination of the average emission of the road vehicle of at least one emission component is first performed, in particular of particles and/or nitrogen oxides, in particular per kilometer, in particular in city driving. For this purpose, either measurements while driving or average values can be utilized, for example, manufacturer specifications.

In particular subsequently, a mounting position of the ambient air purification device at the vehicle can be preferably determined. Further preferred, based on the concentrations of emission components such as particulate matter that depend partially on the spacing from the road surface, the air contamination, i.e., the concentration of the at least one emission component in the mounting position, in particular at its spacing from the road surface, can be determined, for example, by absolute measurement or by a comparative measurement with measurements at standard measuring height at which official measurements are performed.

Moreover, the mounting position can be selected such that, in particular assisted by flow guiding means, at least a portion of the emissions of the road vehicle are supplied to the ambient air purification device, for example, the dust emissions of brake discs and/or tires or the exhaust emissions from the exhaust manifold of an internal combustion engine of the road vehicle. In this way, the separation performance is improved by selecting a mounting position with locally increased concentration of emission components. In this context, the spacing between the outlet of the exhaust system and the ambient air purification device amounts preferably to 5 cm to 50 cm, particularly preferred 5 cm to 30 cm.

Preferably, the mounting position is selected such that the ambient air purification device is arranged at a height of smaller than 2 m, preferably smaller than 1.5 m, particularly preferred smaller than 1 m, measured from the road surface. Preferably, the mounting position is moreover selected at a location where a concentration increase of dust, located in the region of the road surface, is present as a result of turbulence caused by the vehicle according to the invention. This applies in particular to the positions in the rear region in the region of a rear bumper face bar or integrated in a rear bumper face bar, on the roof, on a trailer or in an underfloor region at a vehicle rear behind a rear axle of the road vehicle, viewed in the travel direction.

BRIEF DESCRIPTION OF THE DRAWINGS

Further advantages and expedient embodiments can be taken from the additional claims, the figure description, and the drawings.

DESCRIPTION OF PREFERRED EMBODIMENTS

Figure 1:
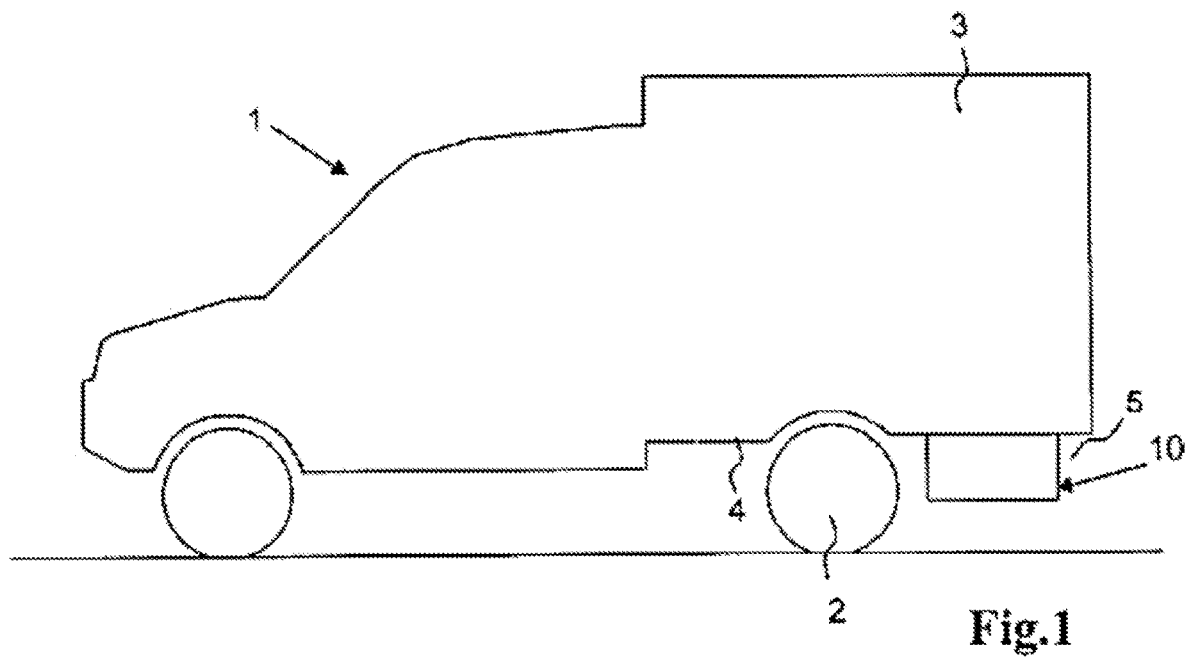
FIG. 1 shows in schematic illustration a road vehicle according to the invention in side view.
Figure 8:
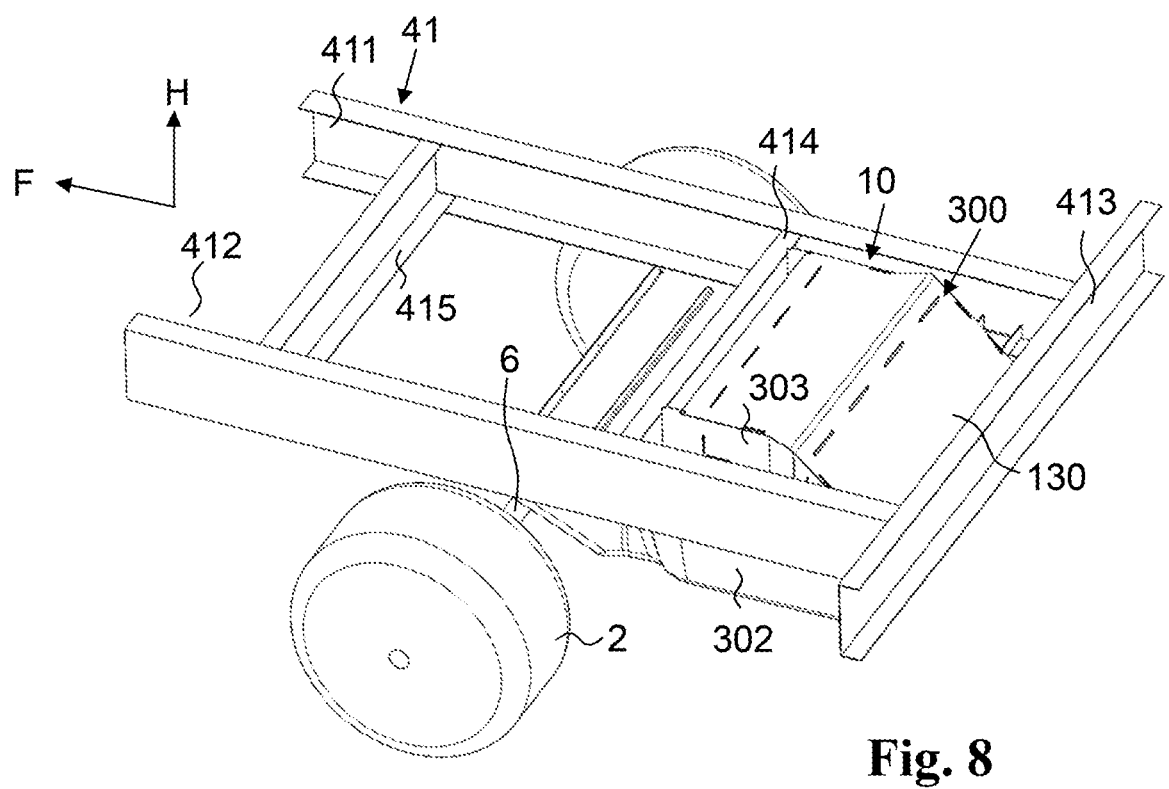
FIG. 8 shows an isometric view of a vehicle frame of a road vehicle according to the invention with ambient air purification device.

FIG. 1 shows an embodiment of a road vehicle 1 according to the invention in a side view. In this case, it is a light delivery truck with box body 3 which is provided, for example, with an electric drive. At the underfloor 4, at the vehicle rear behind the rear axle 6 (e.g., FIGS. 8 and 9) or the rear wheels 2, an ambient air purification device 10 is arranged behind which a free outflow zone 5 is present in which no vehicle-associated installations or the like are present that might impair outflow from the filter element. In the vertical direction, the ambient air purification device 10 is substantially arranged above a transverse axis which is defined by the rear axle 6. In contrast to vehicle-associated air cleaners known from the prior art, by the arrangement at this position neither the outer shape of the vehicle is negatively affected nor are there severe aerodynamic disadvantages created. At the underfloor of the vehicle, a sufficiently high flow speed is provided in driving operation in order to enable flow reliably and without fan, i.e., passive, through the ambient air purification device 10 even at typical travel speeds in city areas.

Figure 2:
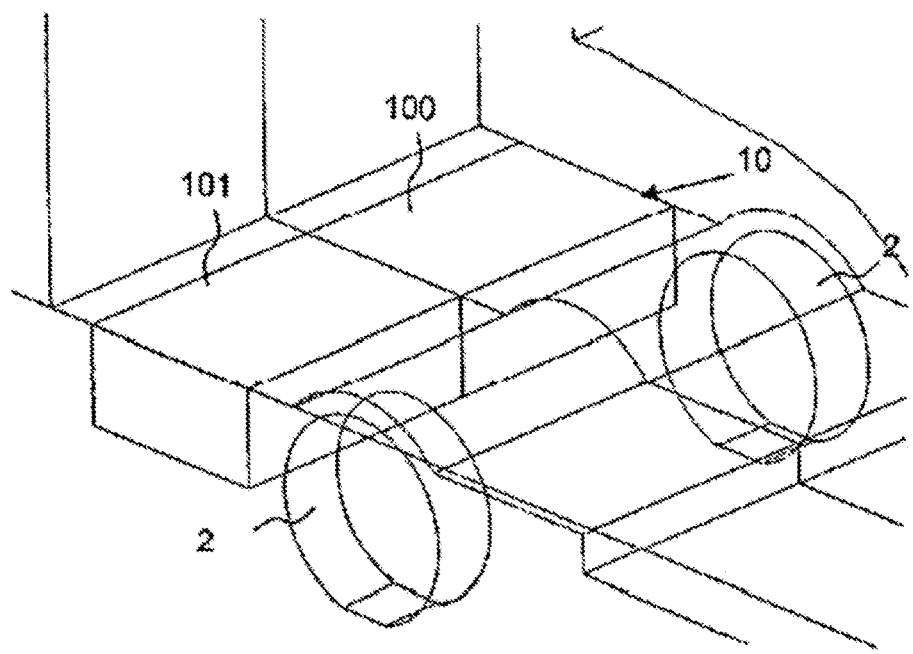
FIG. 2 shows a detail view of the road vehicle according to the invention in a first wide embodiment of the ambient air purification device.
Figure 3:
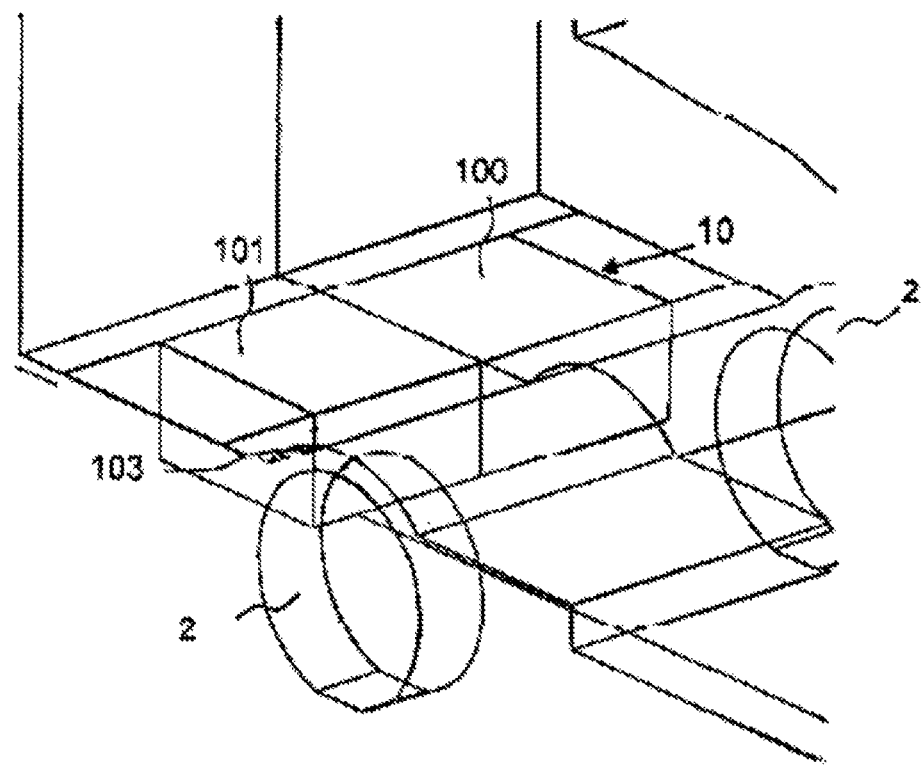
FIG. 3 shows a detail view of the road vehicle according to the invention in a further embodiment with narrow ambient air purification device.

As a functional core, the ambient air purification device 10 comprises two filter elements 100, 101, as illustrated in FIG. 2 and FIG. 3. The filter elements 100, 101 are arranged in transverse vehicle direction adjacent to each other, which is advantageous for the service situation (weight of the element) as well as in the production. In the illustrated embodiments, between the two filter elements 100, 101 there is no gap; however, in an embodiment of the invention that is not illustrated, a gap may be provided at this position in order to pass conduits, frame parts or the like therethrough.

In the embodiment illustrated in FIG. 2, the ambient air purification device 10 or its filter elements 100, 101 extend across the complete width of the vehicle while in FIG. 3 they extend only within the region between the wheels 2 of the rear axle. Even though across a larger filter element a higher separation performance can be achieved, the narrow embodiment of FIG. 3 is considered sufficient because in the region behind the wheels 2, a significantly reduced inflow speed is to be expected anyway in comparison to the free middle region between the rear wheels 2.

Expediently, the ambient air purification device 10 of FIG. 3 can be combined with flow deflectors that increase an effective inflow cross section and thus can contribute to an increase of the impact pressure at the raw side of the filter elements 100, 101 so that already minimal travel speeds are sufficient for flow to pass through. A flow deflector can be arranged, for example, at the outer forward lateral edge 103 extending in vertical direction, advantageously also at the second lateral edge which is facing away from said edge.

Figure 4:
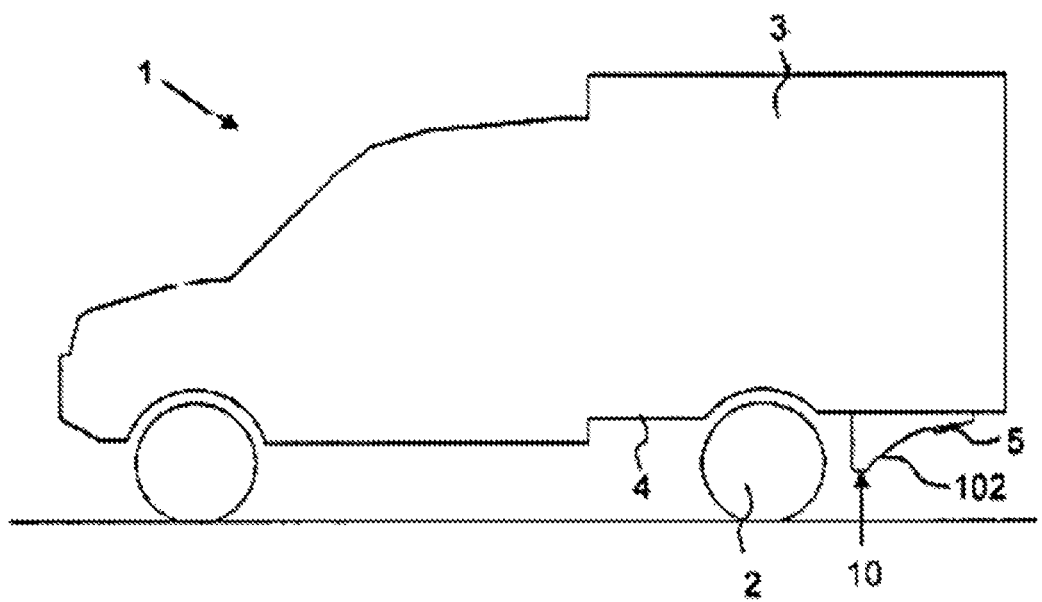
FIG. 4 shows in schematic illustration a road vehicle according to the invention in a further embodiment in side view.

In FIG. 4, a further embodiment of the road vehicle 1 according to the invention is shown wherein the ambient air purification device 10 or its filter element has a decreasing height toward the vehicle rear, which is advantageous in order to not have a disturbing effect when driving on an ascending slope; this edge facing toward the vehicle rear is identified by reference character 102. Such a shape of the filter elements 100, 101 can be achieved, for example, by a variable fold height wherein the folds here extend in longitudinal vehicle direction. However, also other filter element configurations are, of course, conceivable which in particular have shapes that are matched to the underfloor contour in order to optimally utilize the installation space between installations present thereat (for example, batteries, conduits, cables, axle parts); however, this is not illustrated.

Figure 5:
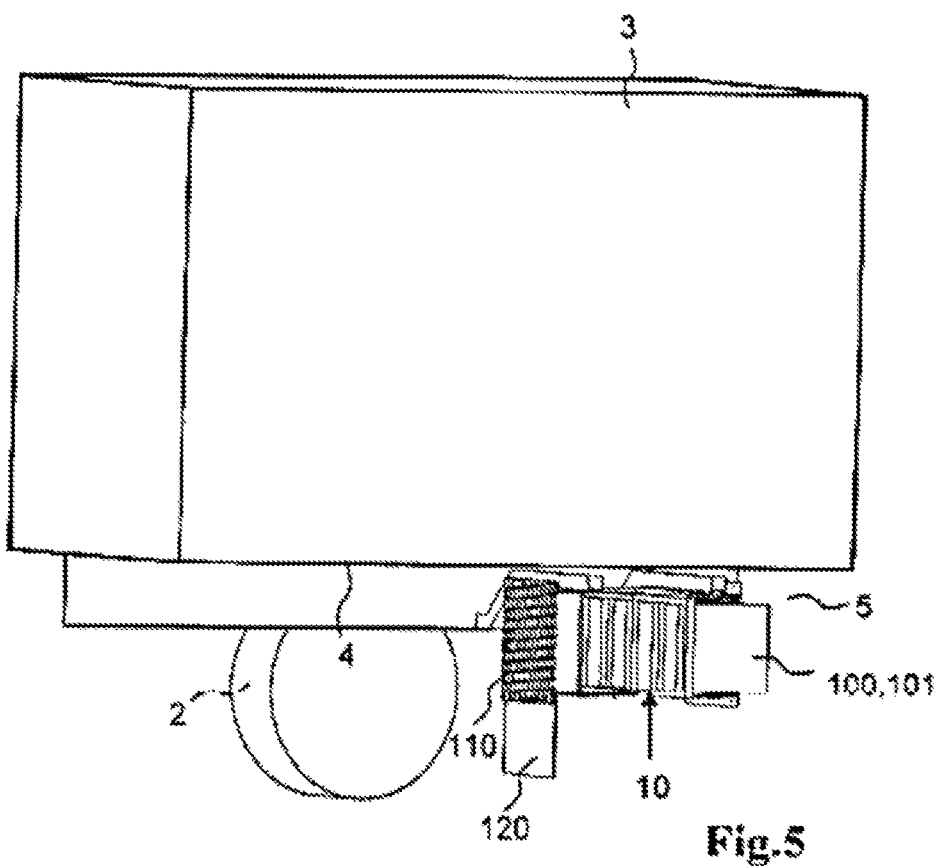
FIG. 5 shows an isometric illustration of a detail of the road vehicle according to the invention according to a further embodiment.

In FIG. 5, a detail of the road vehicle 1 according to the invention in the region of the underfloor 4 is illustrated wherein a left rear wheel has been omitted. According to this embodiment, the ambient air purification device 10 comprises, in addition to the filter element 100, 101, a flow guide plate 120 which is arranged at a lower lateral edge, extending in the transverse vehicle direction, of the ambient air purification device 10 or of the filter element 100, 101. Due to the flow guide plate 120, as described above, the effective inflow cross section is increased. Moreover, a coarse separator 110 is arranged upstream of the filter element 100, 101 in travel direction and is embodied here as a grid 110. The coarse separator 110 prevents that coarser particles, for example, stones, insects or other foreign matter, can pass into the filter element 100, 101 and damage it due to their kinetic energy. In the illustrated embodiment, also a further grid is arranged at a position that is downstream of the filter element 100, 101 in flow direction, i.e., in longitudinal vehicle direction behind the filter element 100, 101. This grid has substantially the same technical effect; in this way, it can be in particular prevented that swirled up foreign matter can pass into the filter element 100, 101.

Moreover, in FIG. 5 a suitable holding device of the ambient air purification device 10 is illustrated which comprises U-shaped carriers, extending in transverse vehicle direction, at which a housing for the filter element 100, 101 is fastened. The housing is a sheet metal construction, in particular of sheet steel, which is producible from a flat starting material by a few deformation steps and bores. Alternatively, the filter element 100, 101 can also be directly connected to the underfloor 4, as already explained.

Figure 6:
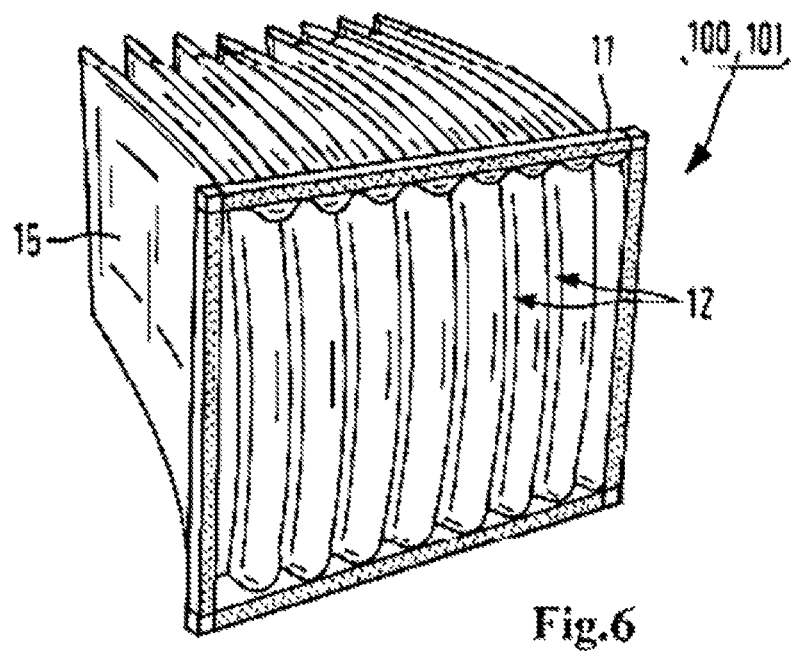
FIG. 6 shows an isometric illustration of a pocket filter as it can be used in the ambient air purification device according to the invention.

In FIG. 6, schematically a pocket filter element 100, 101 is illustrated as it can be used in the ambient air purification device 10 of the road vehicle 1 of FIG. 5. The pocket filter element 100, 101 has a circumferentially extending rectangular frame 11 to which a plurality of, here eight, filter pockets 15 are attached. The filter pockets 15 are comprised of a suitable filter medium and are formed by sewing from the filter medium. Suitably, the pocket filter element is to be arranged such in the ambient air purification device 10 that the filter pockets 15 with their hollow spaces 12, which form the respective inflow sides, are facing forwardly in travel direction. In order to prevent that the filter pockets 15 blow open too strongly by the inflow, oppositely positioned flat filter medium sections can be sown together by means of a suitable thread length. In other respects, the configuration of such filter elements is known to a person of skill in the art. Pocket filter elements are available on the market in a plurality of dimensions, for example, in the field of intake filters for gas turbines or the HVAC field. The illustrated pocket filter element 100, 101 has the dimensions 287 mm×592 mm×365 mm.

Figure 7:
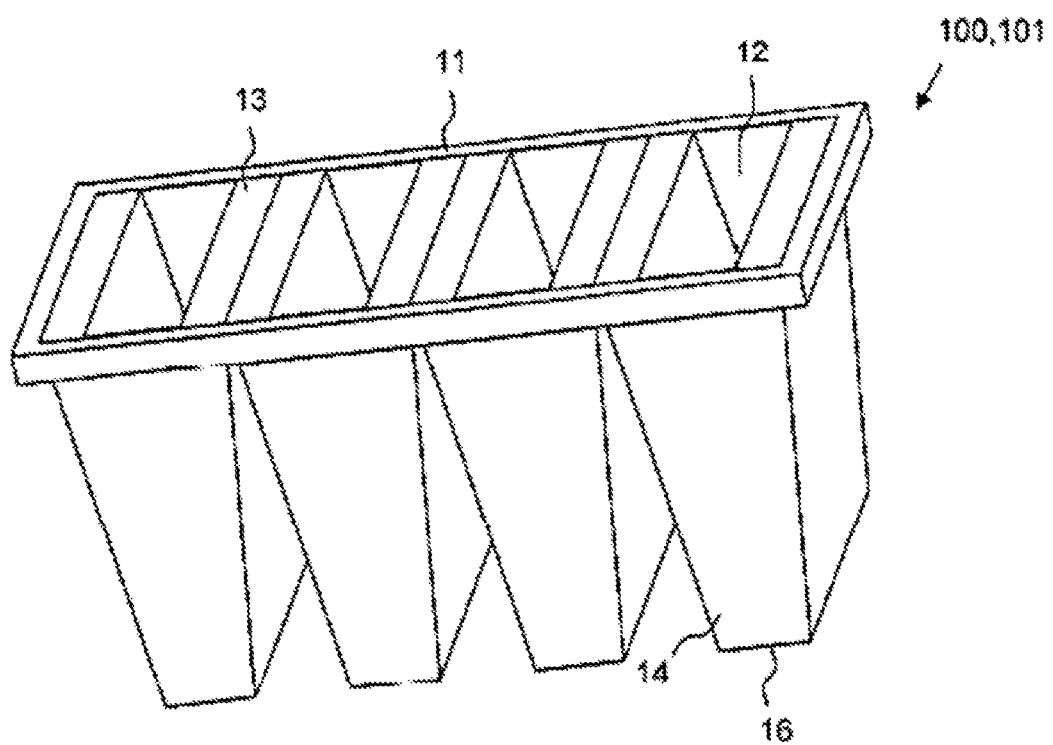
FIG. 7 shows an isometric illustration of a V-filter as it can be used in the ambient air purification device according to the invention.

Moreover, in FIG. 7, a V-filter element 100, 101 is illustrated that comprises four filter units, arranged in a V-shape relative to each, which are formed by two flat filter elements 13, respectively, wherein the flat filter elements 13, for example, comprise a folded filter bellows. The illustrated V-filter element 100, 101 comprises therefore eight flat filter elements 13. The V-filter element 100, 101 comprises a frame 11 to which the V-shaped filter units are attached. At the bottom side which is facing away from the frame 11, two flat filter elements each that form a V-shaped filter unit are fluid-tightly connected to each other, respectively. The lateral surfaces which delimit the aV@ are each fluid-tightly closed off by a flat cover 14. For installation, the remarks in relation to FIG. 6 apply: The V-filter element 100, 101 is suitably inserted into the ambient air purification device 10 such that the hollow spaces 12 face the inflow side, i.e., in the travel direction upon installation in the road vehicle 1 according to the invention. The dimensions of the V-filter element amount to 287 mm×592 mm×300 mm. The fold heights of the respective flat filter elements 13 amount to 25 mm in the illustrated embodiment.

For the pocket filter element illustrated in FIG. 6 as well as for the V-filter element illustrated in FIG. 7 it applies that a suitable number thereof can be arranged adjacently to each other in order to provide an ambient air purification device 10 with a sufficient width. Both variants can be used in the embodiments of road vehicles or ambient air purification devices described above and in the following.

As filter materials, fully synthetic nonwovens, glass fiber or cellulose media as well as combinations thereof can be used which in addition may comprise an electret action or can be accordingly furnished in order to achieve a good ratio of pressure loss and separation performance. Preferably, these media have hydrophobic properties and are distinguished by a good water stability. Also, a filter medium can be used that completely consists of cellulose. The preferred bursting pressure of the filter elements should be in particular above 500 Pa, preferably above 1,000 Pa. The preferred dust capacity of the filter elements amounts to preferably at least 300 g, preferably more than 700 g.

In FIG. 8 to FIG. 11, a detail of the motor vehicle 1 according to the invention, which is schematically shown in FIG. 1 and FIG. 4, is illustrated. Here, only the vehicle frame 41 is shown which is designed as a ladder type frame and comprises two longitudinal sections 411, 412 as main carrier sections. The longitudinal sections 411, 412 are connected at predetermined distances with transverse sections 413, 414, 415 in order to obtain a mechanically load-resistant and torsion-stiff frame 41. Between the two longitudinal sections 411, 412, the ambient air purification device 10 is now received; in this installation space in vehicles with vehicle frames 41, for example, trucks, in particular light trucks, there are otherwise no productive installations present; the installation space is mostly unused. In the illustrated embodiment, the installation space is delimited in the rearward direction by the transverse section 413 which is an underride protection. In order to enable in rearward direction (see arrow F which is indicating the travel direction) an unhindered outflow, the ambient air purification device 10 comprises the flow deflector 130 that is slanted about the transverse axis that deflects the outflowing air slightly in downward direction (see arrow H which indicates the vertical vehicle axis). The receiving housing 300 of the ambient air purification device comprises sidewalls 303 and a bottom pan 302.

Figure 9:
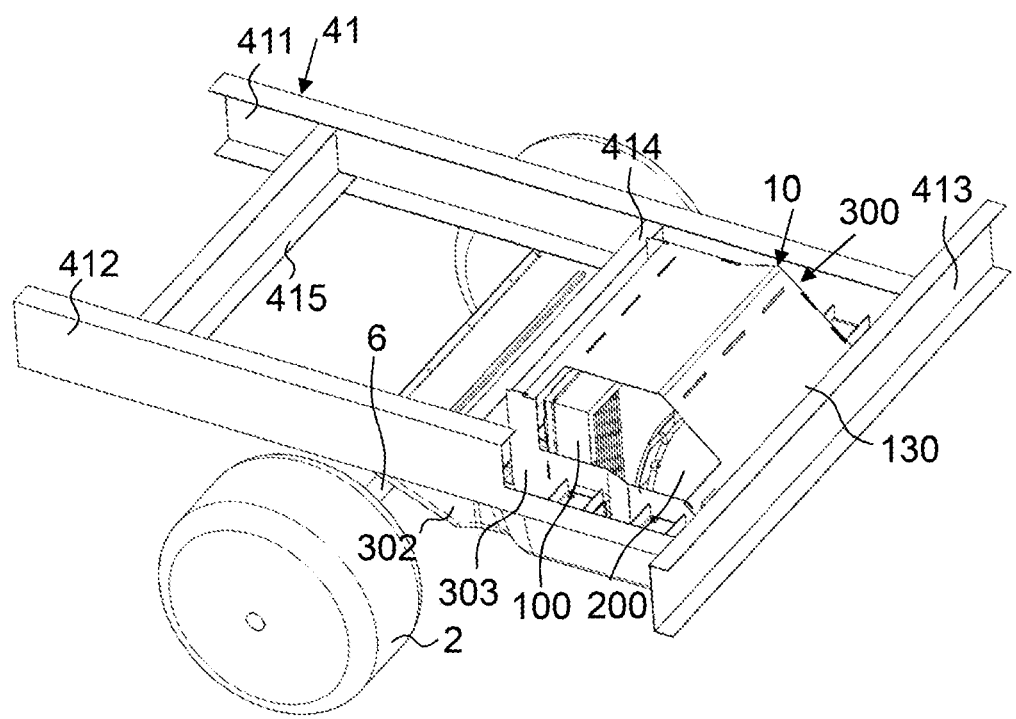
FIG. 9 shows a further isometric view of a vehicle frame of a road vehicle according to the invention with ambient air purification device.

FIG. 9 is a first broken-away illustration wherein parts of the longitudinal section 412, of the side wall 303, and of the flow deflector 130 are eliminated in order to be able to view the interior of the ambient air purification device 10. In the travel direction at the front, within the receiving housing 300 a filter element 100 is first arranged to which a pre-nonwoven may be attached that has a preseparating and water-separating as well as draining function. The filter element 100 can be any filter element described herein, in particular, due to the desired minimal pressure loss, a folded element with a fold height of at least 100 mm. In travel direction father to the rear, two fans 200 are provided which in relation to the filter element 100 are operable in suction operation.

Figure 10:
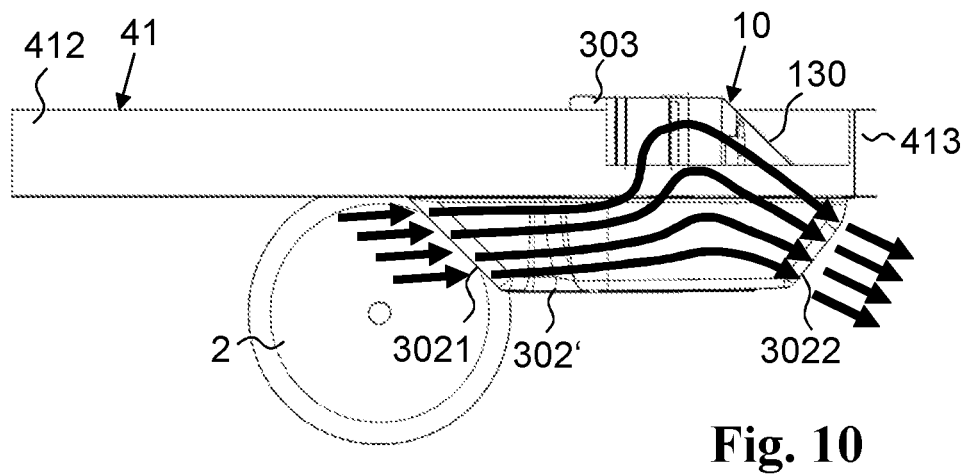
FIG. 10 shows a side view of a vehicle frame of a road vehicle according to the invention with ambient air purification device.

In the side view of FIG. 10, the bottom pan 302 can be seen which, in vertical vehicle direction H, extends to some extent below the longitudinal sections 411, 412. In the bottom pan 302 of the receiving housing 300, in travel direction, at the front an air inlet opening 3021 and at the rear an air outlet opening 3022 are provided through which the purified air, deflected by the flow deflector 130, exits again from the ambient air purification device 10. The air path is identified by the black arrows. The bottom pan 302 protects filter element 100 and fan 200 from splashing water effects. The receiving housing 300, in the illustrated embodiment a part of the bottom pan 302, is slanted at its rear end in the travel direction F in order to interfere as little as possible when driving across ramps. In the side view it can be further seen that the ambient air purification device 10 is arranged above a transverse axis that is defined by the axis of rotation of the wheel pair of the rear axle. In addition, the inlet channel region 302' can be seen which extends from the inlet opening 3021 all the way to the filter element 100, 101. The length extension of the inlet channel region 302' is dimensioned such that the inlet opening 3021 is located between the wheels of the wheel pair of the rear axle and is thus not within the splashing range of the wheels. The inlet channel region is presently formed at least partially by the bottom pan 302.

Figure 11:
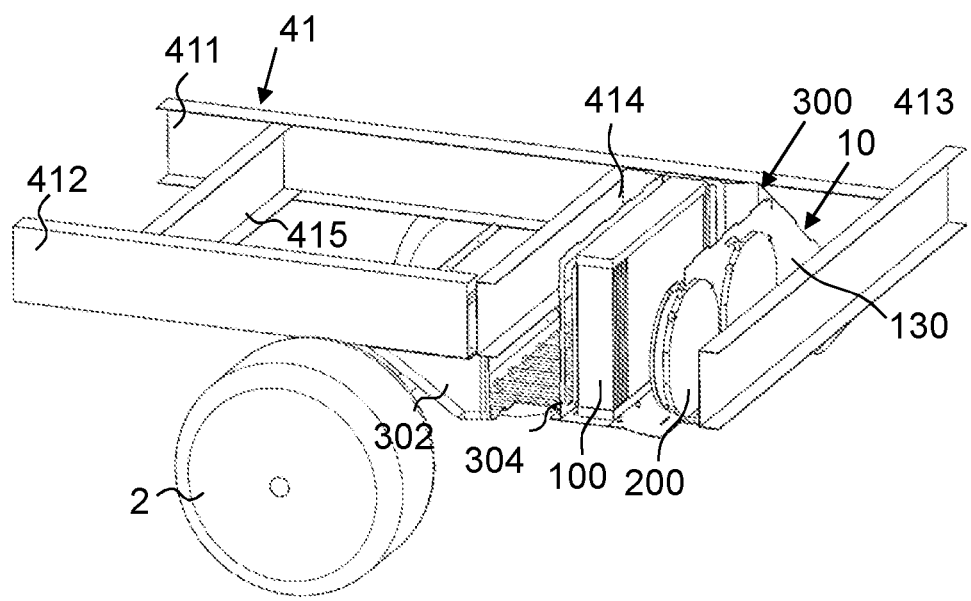
FIG. 11 shows a further isometric view of a vehicle frame of a road vehicle according to the invention with ambient air purification device.

In FIG. 11, finally a further broken-away view is illustrated in which as a further element of the receiving housing 300 a reinforcement wall 304 can be seen which is arranged upstream of the filter element 100 in travel direction. The reinforcement wall has large cutouts and could therefore also be referred to as reinforcement frame. It is connected in a force-introducing way to the bottom pan 302 and the flow deflector 130 in order to form a stiff receiving housing 300.

Figure 12:
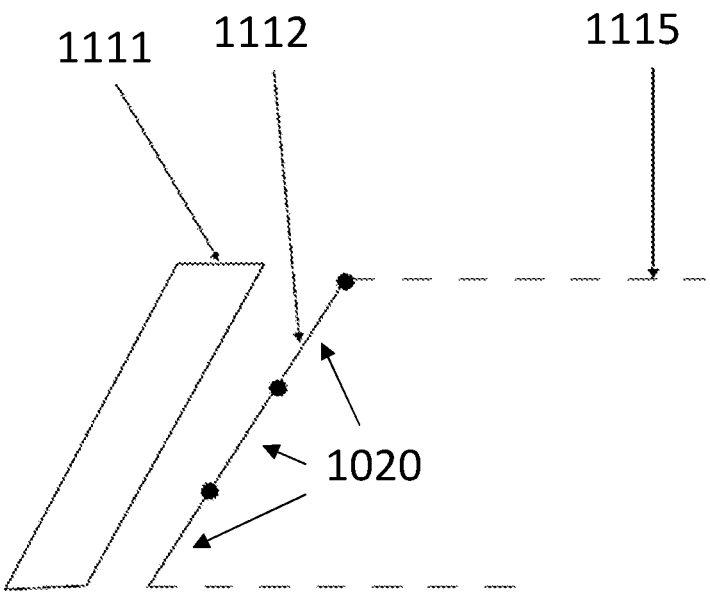
FIGS. 12 and 13 show a schematic illustration of an inflow region of an ambient air purification device, respectively.
Figure 13:
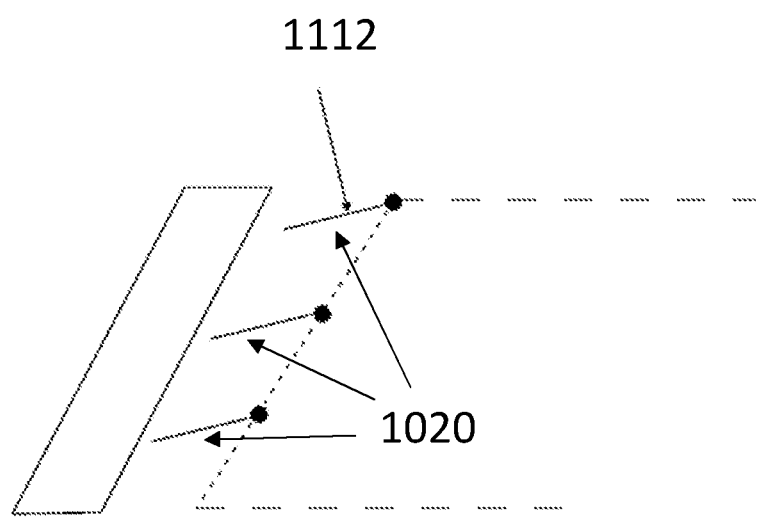

FIGS. 12 and 13 show a schematic illustration of a possible configuration of an inflow-side region of an ambient air purification device according to the invention. As a protective stage 1112, here preferably one or several motor-actuated means, for example, a grid, for preventing entry of animals such as rodents, birds or the like is encompassed.

Figure 14:
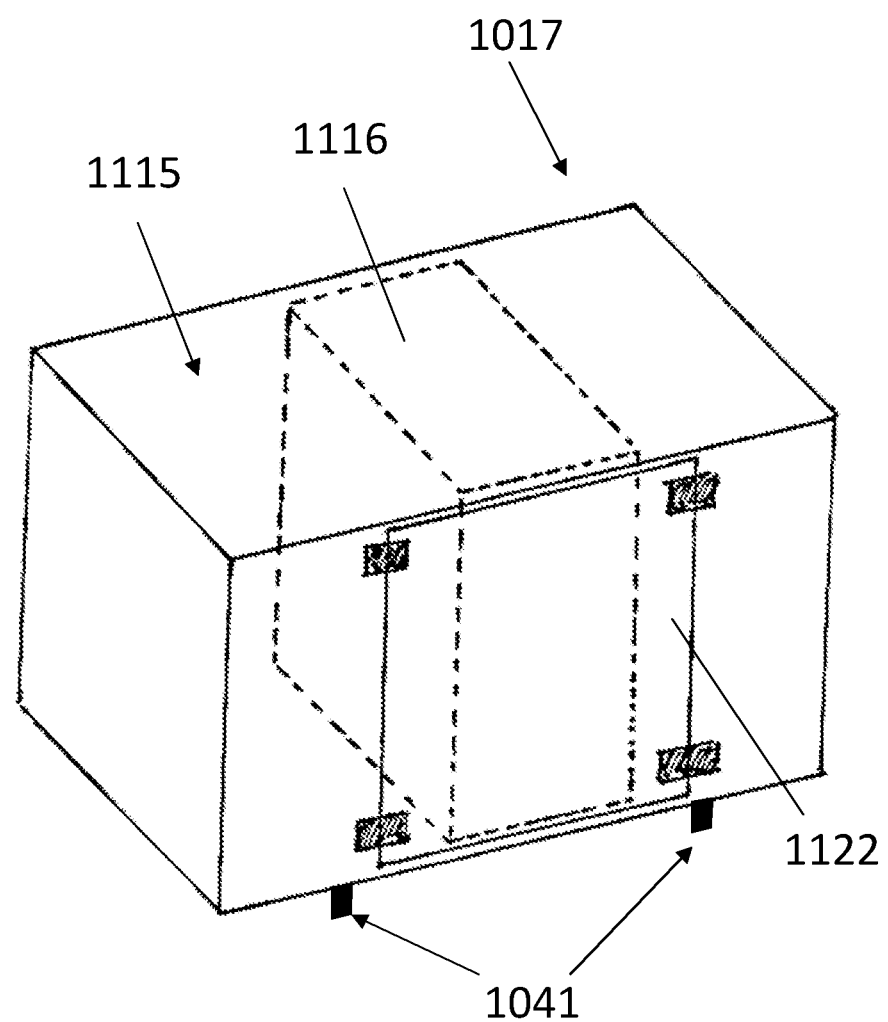
FIG. 14 shows an isometric illustration of a modification for an ambient air purification device according to the invention.

FIG. 14 shows an isometric illustration of a modification 1017 for an ambient air purification device according to the invention. According to this modification, the housing 1115 comprises a servicing opening with a closable servicing flap 1122 that permits an exchange of the filter element 1116. An arrangement of the servicing flap 1122 at a lower wall of the housing 1115 which is facing the road surface is conceivable or advantageous in this context.

Figure 15:
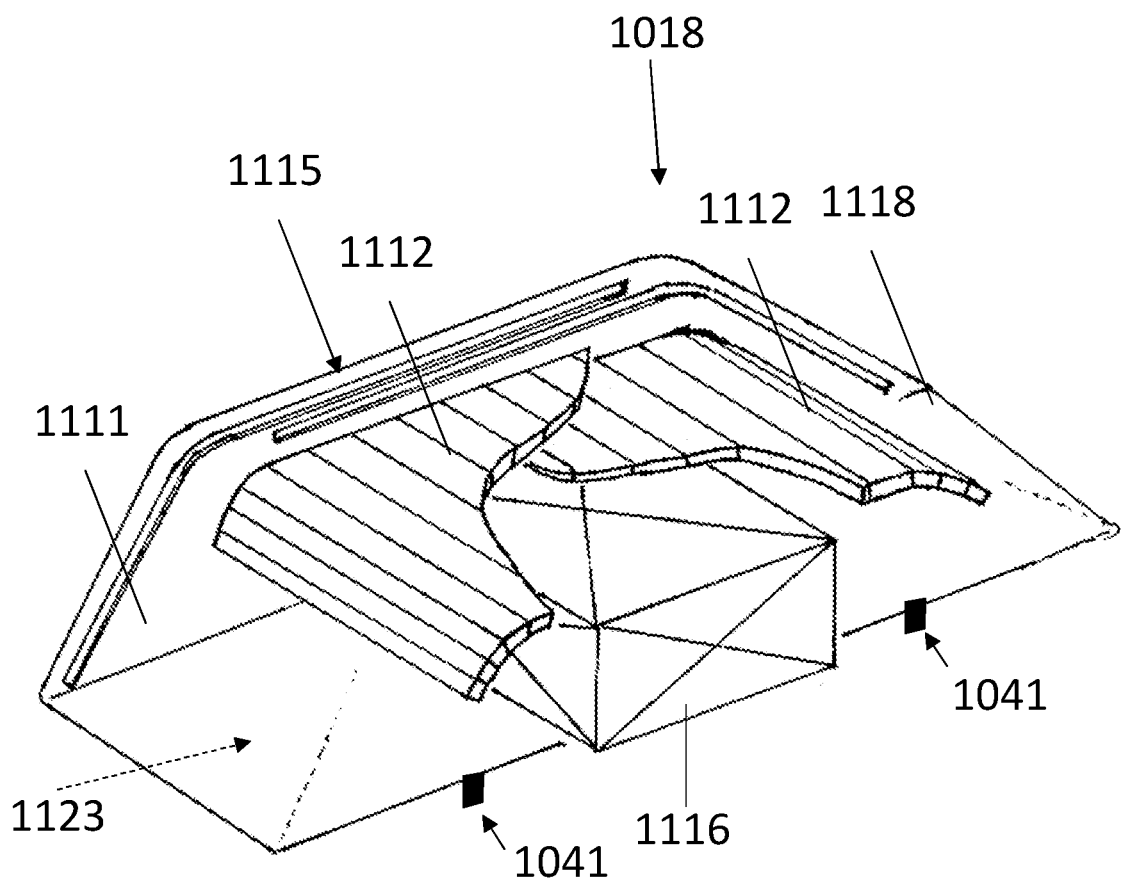
FIG. 15 shows an isometric illustration of a further modification for an ambient air purification device according to the invention.

FIG. 15 shows an isometric illustration of a further modification 1018 for an ambient air purification device in accordance with the invention. Here, as a protective stage 1112, an inflow-side motor-driven first rolling shutter 1124 and/or a second motor-driven rolling shutter 1125 is arranged in the housing 1115 which can close off inlet 1111 or outlet 1118. As in case of the aforementioned flaps, the control of these rolling shutters or flaps is preferably designed such that the rolling shutters or flaps are closed or will be closed when the vehicle is parked and/or beginning at a predetermined flow speed (travel speed), for example, 100 km/h, and/or in case of rain, snow or other temporary water introduction (as in a car wash, when actuating the windshield wiper device or the like). A functional connection with the modification illustrated in FIG. 14 is conceivable in such a way that the servicing flap 1122 can be opened only when the flaps or rolling shutters are open, wherein the flaps or rolling shutters (i.e., more generally: the inlet 1111 and the outlet 1118) are closed, respectively, when the vehicle is not in operation, and are open when the vehicle is in operation. Of course, the aforementioned functions are also controllable independent from each other, depending on the operating state of the vehicle.

What is claimed is:

1. A road vehicle comprising:
a vehicle frame and a rear axle connected to the vehicle frame;
an ambient air purification device comprising one or more filter elements and configured to remove dust, particulate matter, and/or gases from ambient air;
wherein the ambient air purification device is arranged transverse to a longitudinal vehicle axis of the road vehicle in an exterior region of the road vehicle at a vehicle rear of the road vehicle in an underfloor region of the road vehicle such that at least the one or more filter elements are arranged in the exterior region and behind the rear axle of the road vehicle in a travel direction of the road vehicle;
wherein the ambient air purification device is received in an installation space provided by the vehicle frame;
wherein the ambient air purification device is configured to be flowed through in the longitudinal vehicle direction; and
wherein a free outflow zone of the ambient air purification device is arranged in the exterior region and behind the ambient air purification device in the travel direction of the road vehicle.

2. The road vehicle according to claim 1, wherein the vehicle frame comprises frame sections, including longitudinal sections and transverse sections, wherein the installation space for the ambient air purification device is delimited by at least two of the frame sections.

3. The road vehicle according to claim 1, wherein the ambient air purification device comprises at least one air conveying device configured to assist in conveying ambient air through the ambient air purification device.

4. The road vehicle according to claim 3, wherein the at least one air conveying device is arranged relative to the one or more filter elements so as to apply suction to the one or more filter elements.

5. The road vehicle according to claim 1, wherein the ambient air purification device is arranged above a transverse axis defined by a rotational axis of a wheel pair of the rear axle.

6. The road vehicle according to claim 1, further comprising a receiving device arranged in the underfloor region, wherein the ambient air purification device is connected to the receiving device.

7. The road vehicle according to claim 1, wherein the ambient air purification device extends in the transverse vehicle direction across at least 30% of a vehicle width of the road vehicle.

8. The road vehicle according to claim 1, wherein the ambient air purification device comprises at least one receiving housing, wherein the one for more filter elements are received in the at least one receiving housing, wherein the at least one receiving housing comprises an inlet opening and an outlet opening and is connected to the road vehicle.

9. The road vehicle according to claim 8, wherein the at least one receiving housing comprises an inlet channel region arranged downstream of the inlet opening in a flow direction of the ambient air from the inlet opening to the outlet opening, wherein the inlet channel region connects in fluid communication the inlet opening to the one or more filter elements.

10. The road vehicle according to claim 9, wherein the inlet channel region has a length extension such that the inlet opening is located between a wheel pair provided at the rear axle.

11. The road vehicle according to claim 1, wherein the ambient air purification device comprises two or more of the filter elements, wherein the two or more of the filter elements are arranged adjacent to each other in the transverse vehicle direction.

12. The road vehicle according to claim 1, wherein the ambient air purification device comprises one or more flow deflectors arranged at one or more edges of the ambient air purification device selected from the group consisting of:
a forward outer lateral edge of the ambient air purification device, wherein the forward outer lateral edge extends in a vertical vehicle direction;
a forward lower edge of the ambient air purification device, wherein the forward lower edge extends in the transverse vehicle direction; and
a rear upper lateral edge of the ambient air purification device, wherein the rear upper lateral edge extends in the transverse vehicle direction.

13. The road vehicle according to claim 1, wherein the ambient air purification device comprises one or more flow deflectors arranged at a flank of the road vehicle in a longitudinal region positioned between the rear axle and a front axle of the road vehicle.

14. The road vehicle according to claim 1, wherein the ambient air purification device comprises a pre- or coarse separator that is arranged upstream of the one or more filter elements, at least viewed in the travel direction.

15. The road vehicle according to claim 14, wherein the pre- or coarse separator is selected from the group consisting of a separator grid, a separator net, a baffle plate, and a pre-separator nonwoven.

16. The road vehicle according to claim 1, wherein the ambient air purification device comprises a water separator arranged upstream of the one or more filter elements, at least viewed in the travel direction.

17. The road vehicle according to claim 16, wherein the ambient air purification device further comprises a pre- or coarse separator, wherein the water separator is arranged upstream or downstream of the pre- or coarse separator.

18. The road vehicle according to claim 17, wherein the water separator comprises one or more separator elements selected from the group consisting of a lamellar separator, a hydrophobic separator layer, flaps, and lamellas.

19. The road vehicle according to claim 18, wherein the flaps and lamellas are configured to be closeable dependent on a rain sensor signal; a windshield wiper signal; or a rain sensor signal and a windshield wiper signal.

20. An ambient air purification device for a road vehicle, the road vehicle comprising a vehicle frame and a rear axle connected to the vehicle frame, wherein:
the ambient air purification device comprises one or more filter elements;
the ambient air purification device is configured to remove dust, particulate matter, and/or gases from ambient air;
the ambient air purification device is configured to be arranged transverse to a longitudinal vehicle axis in an exterior region of the road vehicle in an underfloor region at a vehicle rear of the road vehicle such that at least the one or more filter elements in a mounted state at the road vehicle are arranged in the exterior region and behind the rear axle of the road vehicle in a travel direction of the road vehicle; and
the ambient air purification device is configured to be received in an installation space of the vehicle frame so that the ambient air purification device is flowed through in a longitudinal vehicle direction and a free outflow zone of the ambient air purification device is arranged in the exterior region and behind the ambient air purification device in the travel direction of the road vehicle.

21. The ambient air purification device according to claim 20, comprising a mounting opening for the one or more filter elements, wherein the mounting opening is arranged laterally, vertically or to the rear of the ambient air purification device in the travel direction of the road vehicle.

22. The ambient air purification device according to claim 20, comprising at least one receiving housing, wherein the one or more filter elements are received in the at least one receiving housing, wherein the at least one receiving housing comprises a bottom pan for mounting the one or more filter elements.

23. The ambient air purification device according to claim 20, wherein the one or more filter elements have one or more specifications selected from the group consisting of: an inflow surface of at least 100 mm×250 mm; a volume of at least 6.5 L; and a net filter surface that amounts to at least 3 m$^2$.

24. The ambient air purification device according to claim 20, wherein the one or more filter elements each are a folded filter element.

25. The ambient air purification device according to claim 24, wherein the folded filter element comprises a variable fold height to adapt an outer contour of the folded filter element to the installation space at the vehicle rear.

26. The ambient air purification device according to claim 25, wherein the outer contour is adapted to a contour of one or more vehicle parts in the underfloor region, wherein the one or more vehicle parts are selected from the group consisting of a wheel suspension, a wheel, an auxiliary device, an exhaust system, and a vehicle battery.

27. A filter element for an ambient air purification device according to claim 20.

28. An ambient air purification device for a road vehicle, the road vehicle comprising a vehicle frame and a rear axle connected to the vehicle frame, wherein:
the ambient air purification device comprises one or more filter elements;
the ambient air purification device is configured to remove dust, particulate matter, and/or gases from ambient air;

the ambient air purification device is configured to be arranged transverse to a longitudinal vehicle axis in an exterior region of the road vehicle in an underfloor region at a vehicle rear of the road vehicle such that at least the one or more filter elements in a mounted state at the road vehicle, viewed in a travel direction of the road vehicle, are arranged behind the rear axle of the road vehicle;

the ambient air purification device is configured to be received in an installation space of the vehicle frame so that the ambient air purification device is flowed through in a longitudinal vehicle direction and a free outflow zone of the ambient air purification device is arranged in the travel direction behind the ambient air purification device; and the ambient air purification device comprises a pressure loss of at most 200 Pa at an inflow of the one or more filter elements with air at standard conditions at 1.5 m/s.

* * * * *